(12) United States Patent
Goellner

(10) Patent No.: US 11,130,622 B2
(45) Date of Patent: Sep. 28, 2021

(54) THERMALLY INSULATED SHIPPING CONTAINER WITH LAYERED ARTICULATING VACUUM INSULATED PANELS

(71) Applicant: Pelican BioThermal, LLC, Plymouth, MN (US)

(72) Inventor: Kai Goellner, Saint Paul, MN (US)

(73) Assignee: Pelican BioThermal, LLC, Plymouth, MN (US)

( * ) Notice: Subject to any disclaimer, the term of this patent is extended or adjusted under 35 U.S.C. 154(b) by 362 days.

(21) Appl. No.: 16/386,768

(22) Filed: Apr. 17, 2019

(65) Prior Publication Data

US 2019/0241350 A1  Aug. 8, 2019

Related U.S. Application Data

(60) Provisional application No. 62/662,470, filed on Apr. 25, 2018.

(51) Int. Cl.
| | | |
|---|---|---|
| *B65D 81/38* | (2006.01) | |
| *F16L 59/065* | (2006.01) | |
| *B65D 88/12* | (2006.01) | |
| *B65D 90/04* | (2006.01) | |

(52) U.S. Cl.
CPC ......... *B65D 81/3825* (2013.01); *B65D 88/12* (2013.01); *B65D 90/041* (2013.01); *F16L 59/065* (2013.01)

(58) Field of Classification Search
CPC ............ B65D 81/3816; B65D 81/3834; B65D 81/3858; B65D 5/5083; B65D 5/0254; B65D 5/4608; B65D 77/042; B65D 90/043; B65D 90/045; B65D 90/046; F16L 59/065

See application file for complete search history.

(56) References Cited

U.S. PATENT DOCUMENTS

| | | | |
|---|---|---|---|
| 3,093,259 | A | 6/1963 | Morrison |
| 4,324,111 | A | 4/1982 | Edwards |
| 4,619,678 | A | 10/1986 | Rubin |
| 4,908,248 | A | 3/1990 | Nakashima et al. |
| 4,923,077 | A | 5/1990 | Van Iperen et al. |
| 6,223,551 | B1 | 5/2001 | Mitchell |
| 6,336,340 | B1 | 1/2002 | Laby |
| 7,919,163 | B2 | 4/2011 | Romero |

(Continued)

FOREIGN PATENT DOCUMENTS

| | | |
|---|---|---|
| CA | 2303574 A1 | 9/2001 |
| WO | 2010132726 A1 | 11/2010 |
| WO | 2011116076 A1 | 9/2011 |

*Primary Examiner* — Andrew T Kirsch
(74) *Attorney, Agent, or Firm* — Sherrill Law Offices, PLLC

(57) ABSTRACT

A kit from which a thermally insulated shipping container may be assembled and a thermally insulated shipping container assembled from such a kit. The kit includes an outer shell and four flat stock vacuum insulated panels, each with three articulating sections foldable to form 3-dimensional C-shaped units. The panels are nestable pairs effective for lining a lower portion of the outer shell with a first nested pair and lining an upper portion of the outer shell with a second nested pair so as to form a fully enclosed insulated payload chamber within the outer shell.

17 Claims, 11 Drawing Sheets

(56) References Cited

U.S. PATENT DOCUMENTS

| | | | |
|---|---|---|---|
| 8,250,882 B2 * | 8/2012 | Mustafa | B65D 81/3862 62/457.2 |
| 2002/0144482 A1 | 10/2002 | Henson et al. | |
| 2003/0128898 A1 | 7/2003 | Malone et al. | |
| 2007/0175236 A1 | 8/2007 | Dryzun | |
| 2009/0230138 A1 | 9/2009 | Williams et al. | |
| 2011/0120040 A1 | 5/2011 | Alderman | |

* cited by examiner

THERMALLY INSULATED SHIPPING CONTAINER WITH LAYERED ARTICULATING VACUUM INSULATED PANELS

BACKGROUND

Thermally labile goods are frequently transported or shipped in thermally insulated shipping containers, often with a thermally conditioned phase change material within the payload chamber of the container, to prevent spoilage, decomposition, deactivation, transformation, conversion, breakdown, denaturing, etc. of the thermally labile goods.

Numerous insulated shipping containers have been developed over the years, with those utilizing vacuum insulated panels and deploying a phase change material (PCM) generally providing superior temperature control over extended periods. A nonexhaustive list of United States Patents and Published Patent Applications disclosing thermally insulated shipping containers with or without a PCM include U.S. Pat. Nos. 1,936,214; 2,289,060; 2,781,643; 2,961,116; 3,074,586; 3,093,259; 3,236,206; 3,262,283; 3,327,882; 3,810,367; 4,145,895; 4,235,346; 4,292,817; 4,319,629; 4,368,819; 4,425,998; 4,579,170; 4,688,398; 4,923,077; 4,931,333; 5,226,557; 5,435,142; 5,626,936; 5,669,233; 5,758,513; 5,875,599; 5,899,088; 5,924,302; 5,979,693; 6,070,427; 6,116,042; 6,209,343; 6,220,473; 6,244,458; 6,325,281; 6,666,032; 6,718,776; 6,714,508; 6,761,041; 6,868,982; 6,875,486; 7,028,504; 7,147,125; 7,257,963; 7,294,374; 7,328,583; 7,422,143; 7,500,593; 7,908,870, and 7,950,246, United States Patent Application Publications 2002/0134962; 2002/0144482; 2002/0050147; 2004/0079793; 2004/0079794; 2005/0188714; 2005/0189404; 2007/0186577; 2008/0135564; 2009/0078699; 2009/0078708; 2010/0064698; 2010/0072211; 2010/0314397; 2010/0326993; 2011/0114513 and 2011/0147391; and Published International Applications WO 99/32374; WO 2010/055295; 2010/136769 and 2011/046940, the disclosures of which are all incorporated by reference.

Vacuum insulated panels, comprising a core material hermetically sealed under vacuum within a flexible film, are superior thermal insulators. Unfortunately, these panels become extremely poor thermal insulators upon loss of vacuum, and are notoriously susceptible to frequent loss of vacuum without any advance warning.

Accordingly, a substantial need exists for vacuum insulation panels suitable for use in assembly of thermally insulated shipping containers which are (i) relatively simple to use in assembly of thermally insulated shipping containers (i.e., intuitive configuration and arrangement of the components), (ii) capable of providing dual individual layers of vacuum insulated panels around a thermally insulated payload chamber whereby failure of one layer does not result in a catastrophic loss of thermal insulation through any portion of the container walls, and (iii) offsets the panel seams in the layers of vacuum insulated panels so as to inhibit thermal flux into and out from the container through any gaps in the seams.

SUMMARY OF THE INVENTION

A kit from which a thermally insulated shipping container may be assembled and a thermally insulated shipping container assembled from such a kit.

The kit includes an outer shell and four flat stock rectangular cuboidal vacuum insulated panels. The outer shell has a bottom, sidewalls and an openable top, and defines a volume. The four flat stock rectangular cuboidal vacuum insulated panels each have a linear row of one central and two distal rigid articulating panel sections capable of being folded into a 3-dimenisonal C-shaped unit. The four flat stock rectangular cuboidal vacuum insulated panels are configured and arranged such that when folded into 3-dimenisonal C-shaped units a first unit can nest within a second unit to form a lower box-portion of thermal insulation sized for lining the bottom and a lower portion of the sidewalls of the volume, and a third unit can nest within a fourth unit to form an upper box-portion of thermal insulation sized for covering the open top and lining an upper portion of the sidewalls of the volume.

The kit can further include a primary pair of dual panel wall units each formed from a flat stock rectangular cuboidal vacuum insulated panel having two articulating panel sections each with a 45° beveled facing edge, wherein the primary flat stock rectangular cuboidal vacuum insulated panels are configured and arranged such that when folded into wall units they can cooperatively form a sleeve of thermal insulation configured for lining a thermally insulated payload chamber formed by lining the volume with all four of the C-shaped units.

The kit can still further include a secondary pair of dual panel wall units each formed from a flat stock rectangular cuboidal vacuum insulated panel having two articulating panel sections each with a 45° beveled facing edge, wherein the secondary flat stock rectangular cuboidal vacuum insulated panels are configured and arranged such that when folded into wall units they can cooperatively form a secondary sleeve of thermal insulation configured for placement between lower and upper box portions formed from the four flat stock rectangular cuboidal vacuum insulated panels with lower edges of the secondary sleeve abutting the exposed end edges of the distal panel sections of the lower box portion, and upper edges of the secondary sleeve abutting the exposed end edges of the distal panel sections of the upper box portion.

The container includes an outer shell, a lower box-portion of thermal insulation and an upper box-portion of thermal insulation. The outer shell has a bottom, sidewalls and an openable top, and defines a volume. The lower box-portion of thermal insulation lines the bottom and lower portions of the sidewalls of the outer shell while the upper box-portion of thermal insulation covers the openable top and lines upper portions of the sidewalls of the outer shell. The lower box portion of thermal insulation includes nested first and second C-shaped units wherein each C-shaped unit is formed from a flat stock rectangular cuboidal vacuum insulated panel having a linear row of one central and two distal rigid articulating panel sections, The upper box portion of thermal insulation includes nested third and fourth C-shaped units wherein each C-shaped unit is formed from a flat stock rectangular cuboidal vacuum insulated panel having a linear row of one central and two distal rigid articulating panel sections.

The container can further include an inner sleeve of thermal insulation lining the sidewalls of the thermally insulated payload chamber whereby the thermally insulated payload chamber is completely enclosed by a dual layer of vacuum insulation. The inner sleeve of thermal insulation includes a pair of dual panel wall units each formed from a flat stock rectangular cuboidal vacuum insulated panel having two articulating panel sections each with a 45° beveled facing edge.

The container can still further include an outer sleeve of thermal insulation lining the volume between the lower and upper box portions with lower edges of the outer sleeve abutting the exposed end edges of the distal panel sections of the lower box portion, and upper edges of the outer sleeve abutting the exposed end edges of the distal panel sections of the upper box portion. The outer sleeve of thermal insulation includes a pair of dual panel wall units each formed from a flat stock rectangular cuboidal vacuum insulated panel having two articulating panel sections each with a 45° beveled edge facing the other panel section.

DETAILED DESCRIPTION OF A PREFERRED EMBODIMENT

Definitions

Figure 1:
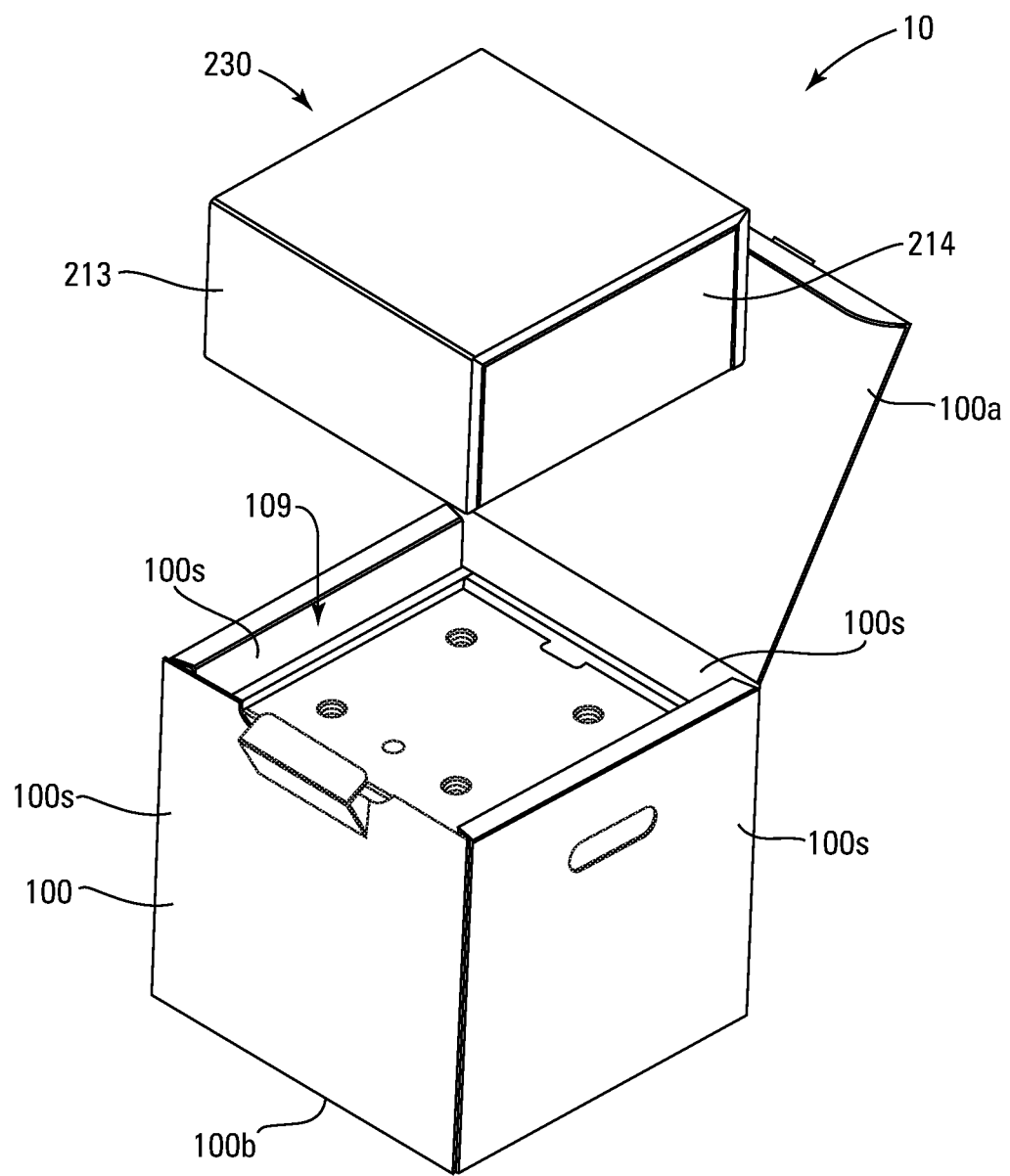
FIG. 1 is a perspective view of one embodiment of the invention with the upper box portion of the thermal insulation lifted to provide access to the thermally insulated payload chamber.
Figure 2:
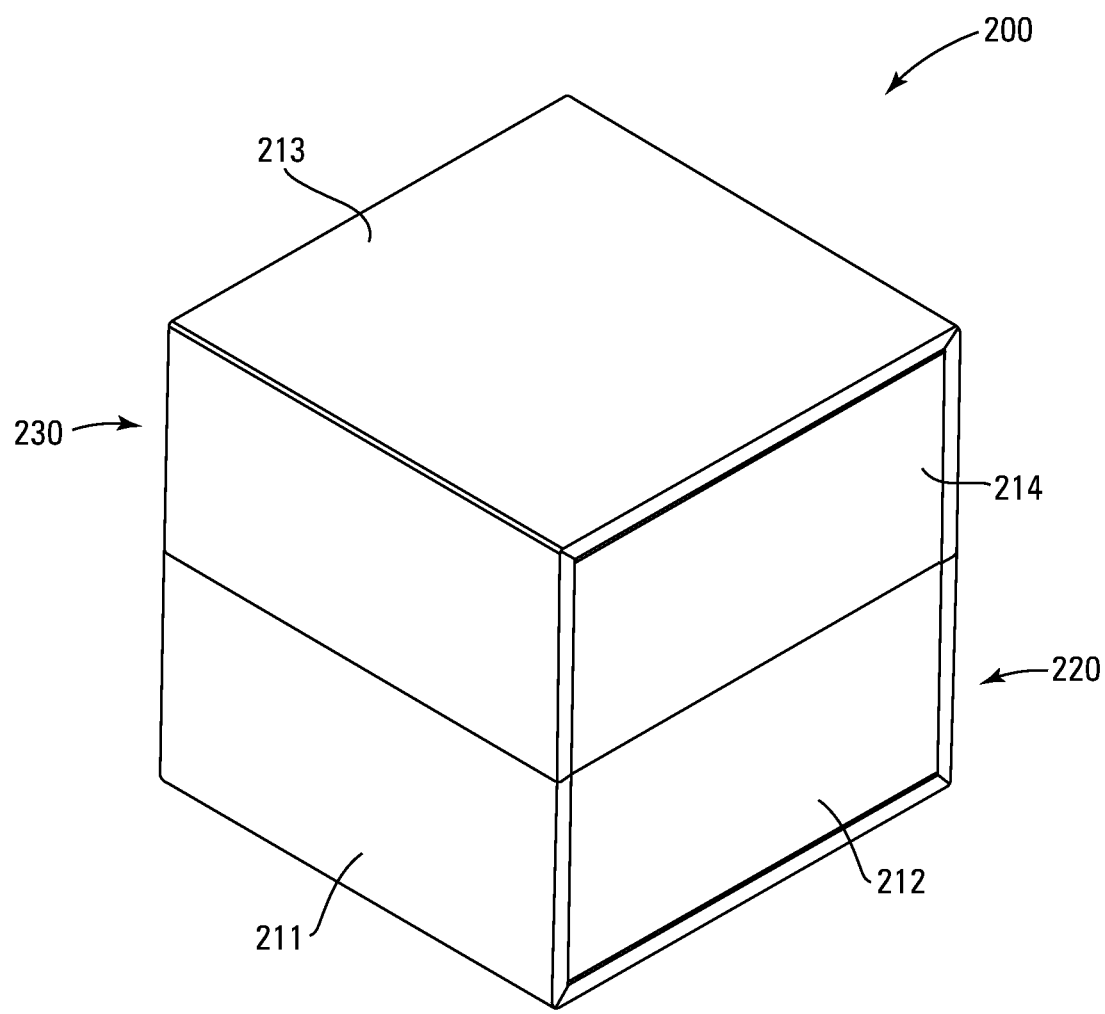
FIG. 2 is a front perspective view of the thermal insulation layer of the invention depicted in FIG. 1.
Figure 3:
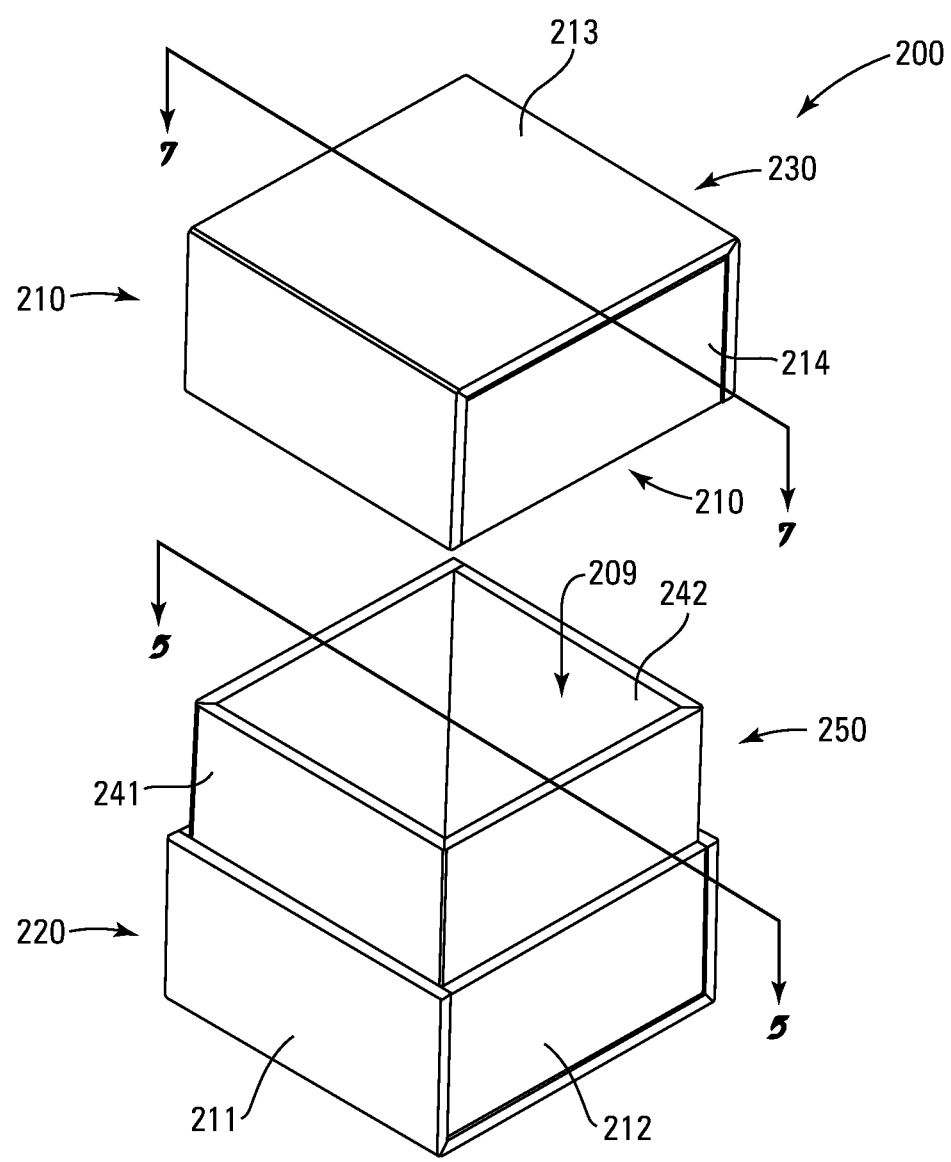
FIG. 3 is a front perspective view of the thermal insulation layer depicted in FIG. 2 with the upper box portion of the thermal insulation layer lifted to provide access to the thermally insulated payload chamber.
Figure 4:
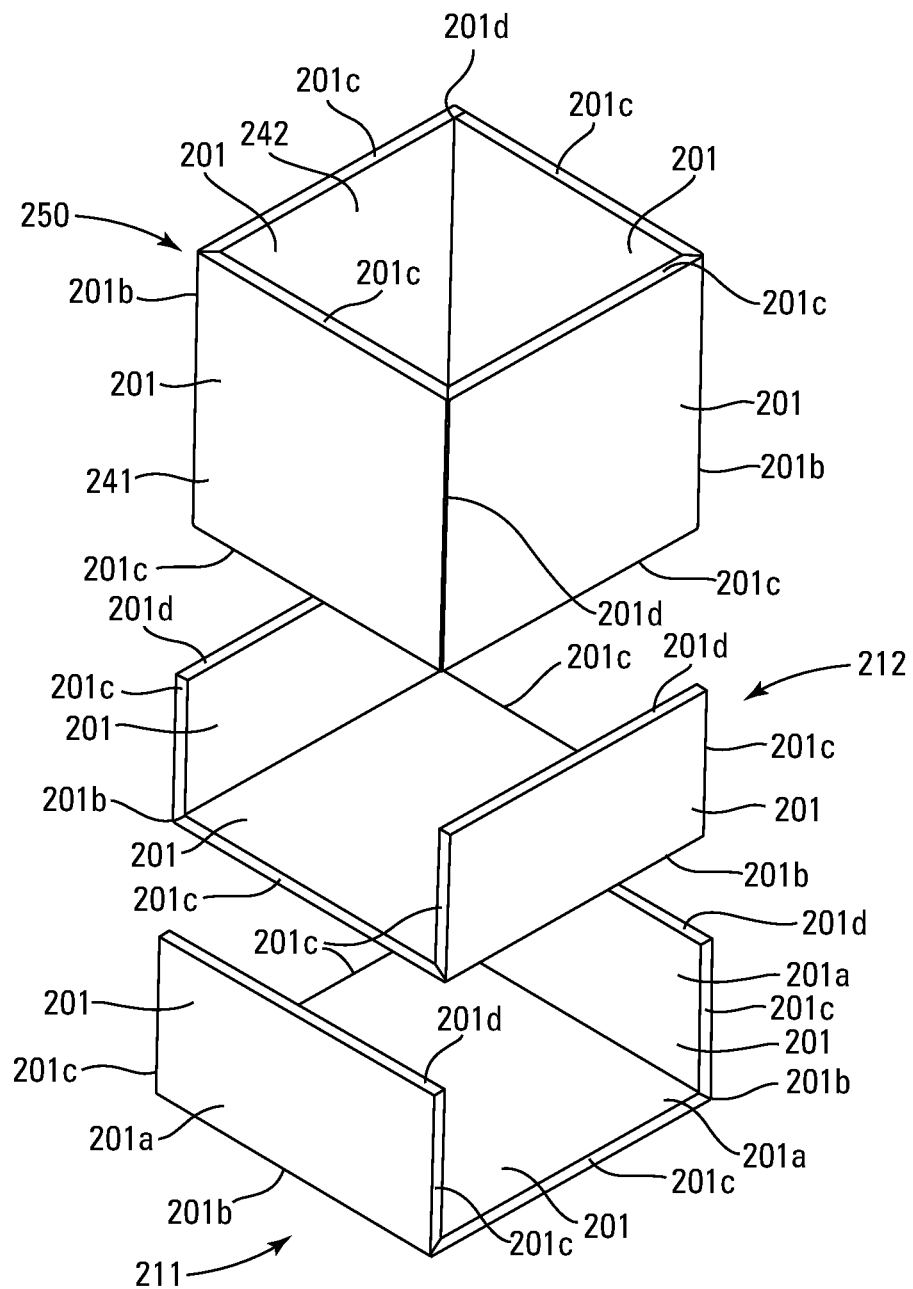
FIG. 4 is an exploded perspective view of the lower box portion and the inner sleeve component of the thermal insulation layer depicted in FIG. 3.

As utilized herein, including the claims, the phrase "beveled edge" in reference to an edge of a vacuum insulated panel section on a unit of thermal insulation means an edge cut at an angle or a frangible rabbeted orthogonal edge capable of ready deformation into a course but effective angled edge upon pulling of the vacuum and/or folding of the unit into its three dimensional configuration.

Nomenclature

| REF. NO. | DESCRIPTION |
|---|---|
| 10 | Shipping Container |
| 100 | Outer Shell |
| 100a | Top of Outer Shell |
| 100b | Bottom of Outer Shell |
| 100s | Sidewall(s) of Outer Shell |
| 109 | Volume |
| 200 | Thermal Insulation Layer |
| 201 | Vacuum Insulated Panel Section |
| 201a | Major Surface of Vacuum Insulated Panel Section |
| 201b | Beveled Facing Edge of Vacuum Insulated Panel Section |
| 201c | Orthogonal Side Edge of Vacuum Insulated Panel Section |
| 201d | Orthogonal End Edge of Vacuum Insulated Panel Section |
| 202 | Central Panel Section of Thermal Insulation |
| 203 | Distal Panel Section of Thermal Insulation |
| 209 | Insulated Payload Chamber |
| 210 | Three Panel C-shaped Units of Thermal Insulation |
| 211 | First Three Panel C-shaped Unit of Thermal Insulation |
| 212 | Second Three Panel C-shaped Unit of Thermal Insulation |
| 213 | Third Three Panel C-shaped Unit of Thermal Insulation |
| 214 | Fourth Three Panel C-shaped Unit of Thermal Insulation |
| 220 | Lower Box Portion of Thermal Insulation |
| 230 | Upper Box Portion of Thermal Insulation |
| 240 | Dual Panel Wall Units of Thermal Insulation |
| 241 | First Dual Panel Wall Unit of Thermal Insulation |
| 242 | Second Dual Panel Wall Unit of Thermal Insulation |
| 243 | Third Dual Panel Wall Unit of Thermal Insulation |
| 244 | Fourth Dual Panel Wall Unit of Thermal Insulation |
| 250 | Inner Sleeve of Thermal Insulation |
| 260 | Outer Sleeve of Thermal Insulation |
| w | Thickness of Vacuum Insulated Panel Section |
| x | Exterior Length of C-shaped Unit |
| y | Exterior Width of C-shaped Unit |
| z | Exterior Height of C-shaped Unit |

Construction

Referring generally to FIGS. 1-11, the invention is a kit from which a thermally insulated shipping container 10 may be assembled and a thermally insulated shipping container 10 assembled from such a kit so as to define a thermally insulated payload chamber 209. The container 10 has an outer shell 100 defining a volume 109, and at least one layer and preferably dual layers of thermal insulation 200 within the volume 109 defining the thermally insulated payload chamber 209. The container 10 may also include a layer of phase change material panels (not shown) within the thermally insulated payload chamber 209 in accordance with common practice for long-term thermally insulted shipping containers.

Figure 8:
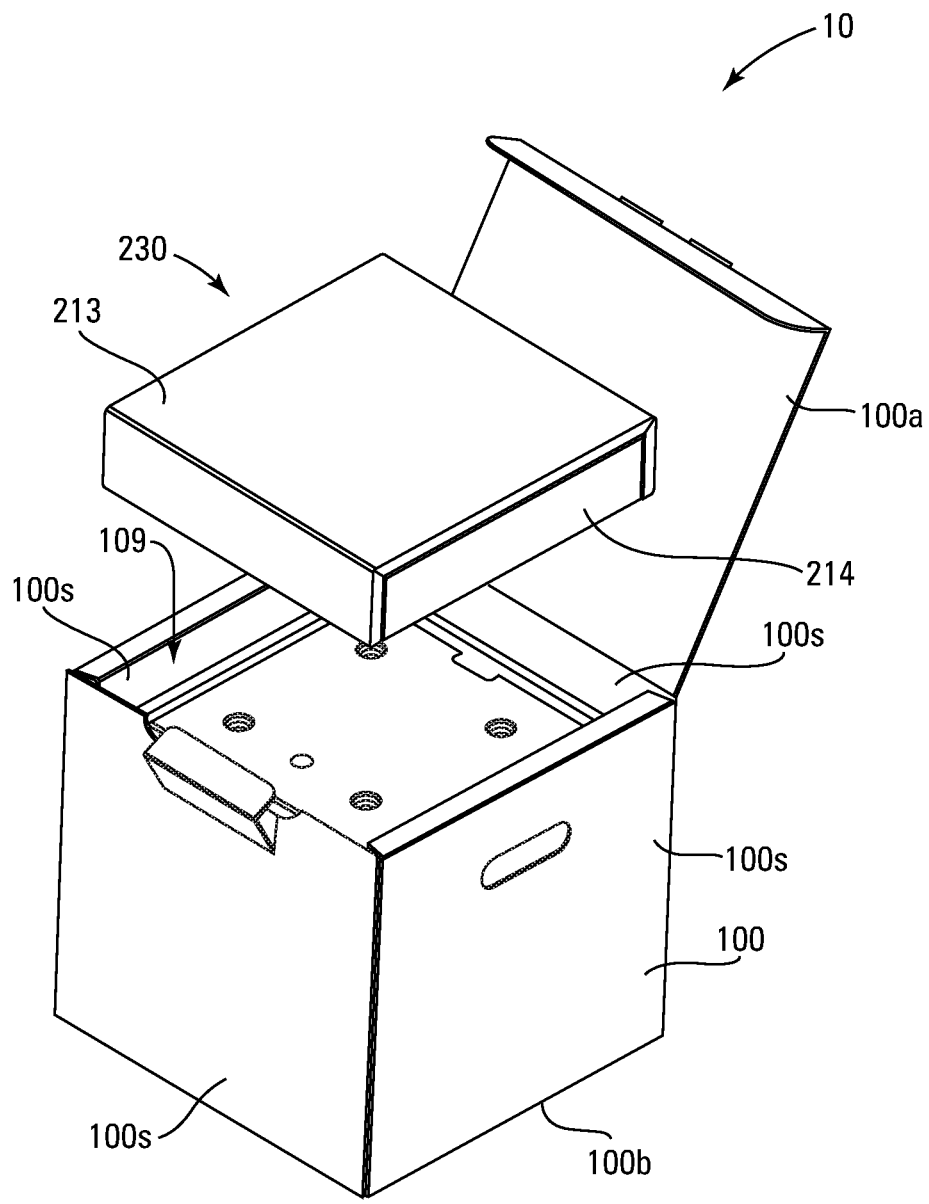
FIG. 8 is a perspective view of another embodiment of the invention with the upper box portion of the thermal insulation lifted to provide access to the thermally insulated payload chamber.

Referring to FIGS. 1 and 8, the outer shell 100 has top 100a, bottom 100b and four sidewalls 100s. The top 100a is removable to provide access to the volume 109 defined by the outer shell 100. The outer shell 100 may be made from any material possessing sufficient structural integrity, including specifically but not exclusively, cellulosic materials such as paperboard and cardboard, engineered wood products such as laminated and unlaminated fiberboard and plywood, wood, plastics such as solid and corriboard sheets of polyethylene, polypropylene, polyethylene terephthalate, nylon polycarbonates and phenolic resins, wood-plastic composites, metals such as aluminum, copper, brass and steel, glass, ceramics, combinations thereof, and the like.

Referring to FIGS. 1-11, the layer of thermal insulation 200 lines the volume 109 so as to define an insulated payload chamber 209. The layer of thermal insulation 200 is comprised of a plurality of thermal insulation units (not collectively numbered), each having a plurality of vacuum insulated panel sections 201 under individual or common vacuum configured and arranged to articulate relative to one another to allow formation of three-dimensional units.

Each vacuum insulated panel section 201 has two transversely spaced major surfaces 201a, and four edges selected from beveled facing edges 201b, orthogonal side edges 201c and orthogonal end edges 201d.

The layer of thermal insulation 200 includes at least a lower box-portion of thermal insulation 220 and an upper box portion of thermal insulation 230, each formed from a pair of C-shaped units 210.

The C-shaped units 210 are each formed from a flat stock rectangular cuboidal vacuum insulated panel having a linear row of one central 202 and two distal 203 rigid articulating panel sections. The central panel section 202 has two transversely spaced major surfaces 201a, a pair of longitudinally spaced 45° beveled facing edges 201b and a pair of laterally spaced orthogonal side edges 201c with each of the beveled facing edges 201b on the central articulating panel section 202 facing one of the distal panel sections 203. The distal panel sections 203 each have two transversely spaced major surfaces 201a, a single 45° beveled facing edge 201b facing the central panel section 202, a single orthogonal end edge 201d longitudinally spaced from the beveled facing edge 201b, and a pair of laterally spaced orthogonal side edges 201c.

The lower box-portion of thermal insulation 220 lines the bottom 100b and lower portions of the sidewalls 100s of the outer shell 100. The upper box-portion of thermal insulation 230 covers the top 100a and upper portions of the sidewalls 100s of the outer shell 100.

The lower box portion of thermal insulation 220 is formed from a first C-shaped unit 211 and a second C-shaped unit 212, with the second C-shaped unit 212 nested within the first C-shaped unit 211 and rotated 90° about the transverse axis of the central panel section 202 of the first C-shaped unit 211 so as to provide a 90° rotational offset of the distal panel sections 203 and form a four-sided box structure.

The upper box portion of thermal insulation 230 is formed from a third C-shaped unit 213 and a fourth C-shaped unit 214, with the fourth C-shaped unit 214 nested within the third C-shaped unit 213 and rotated 90° about the transverse axis of the central panel section 202 of the third C-shaped unit 213 so as to provide a 90° rotational offset of the distal panel sections 203 and form a four-sided box structure.

In a preferred embodiment, the first and third C-shaped units 211 and 213 have identical dimensions, and the second and fourth C-shaped units 212 and 214 have identical dimensions, thereby reducing the number of different components and simplifying assembly.

The C-shaped units 210 preferably have the following relative dimensions wherein (i) length (x) is the exterior length measured laterally from one orthogonal side edge 201c of the central panel 202 to the other orthogonal side edge 201c of the central panel 202, (ii) width (y) is the exterior width measured longitudinally from one facing edge 201b of the central panel 202 to the other facing edge 201b of the central panel 202, (iii) height (z) is the exterior height measured from the orthogonal end edge 201d of either distal panel section 203 to the facing edge 201b of the same distal panel section 203, and (iv) thickness (w) is a common uniform thickness of each panel section 201 on each C-shaped unit 210.

| C-SHAPED UNIT | LENGTH | WIDTH | HEIGHT |
|---|---|---|---|
| First (211) | $x_1$ | $y_1$ | $z_1$ |
| Second (212) | $y_1 - 2w$ | $x_1$ | $z_1 - w$ |
| Third (213) | $x_3$ | $y_3$ | $z_3$ |
| Fourth (214) | $y_3 - 2w$ | $x_3$ | $z_3 - w$ |

Referring to FIGS. 3-5 and 9-11, in order to completely surround the thermal insulated payload chamber 209 with a dual layer of thermal insulation 200, an inner sleeve of thermal insulation 250 lines the sidewalls of the thermally insulated payload chamber 209. The inner sleeve of thermal insulation 250 is comprised of a pair of two panel wall units 240, each having two vacuum insulated panel sections 201 under individual or common vacuum configured and arranged to articulate relative to one another to allow formation of three-dimensional units.

These first 241 and second 242 wall units are each formed from a flat stock rectangular cuboidal vacuum insulated panel having two articulating panel sections 201, each having two transversely spaced major surfaces 201a, a beveled facing edge 201b facing the other panel section 201, a single orthogonal end edge 201d longitudinally spaced from the beveled facing edge 201b, and a pair of laterally spaced orthogonal side edges 201c.

Figure 5:
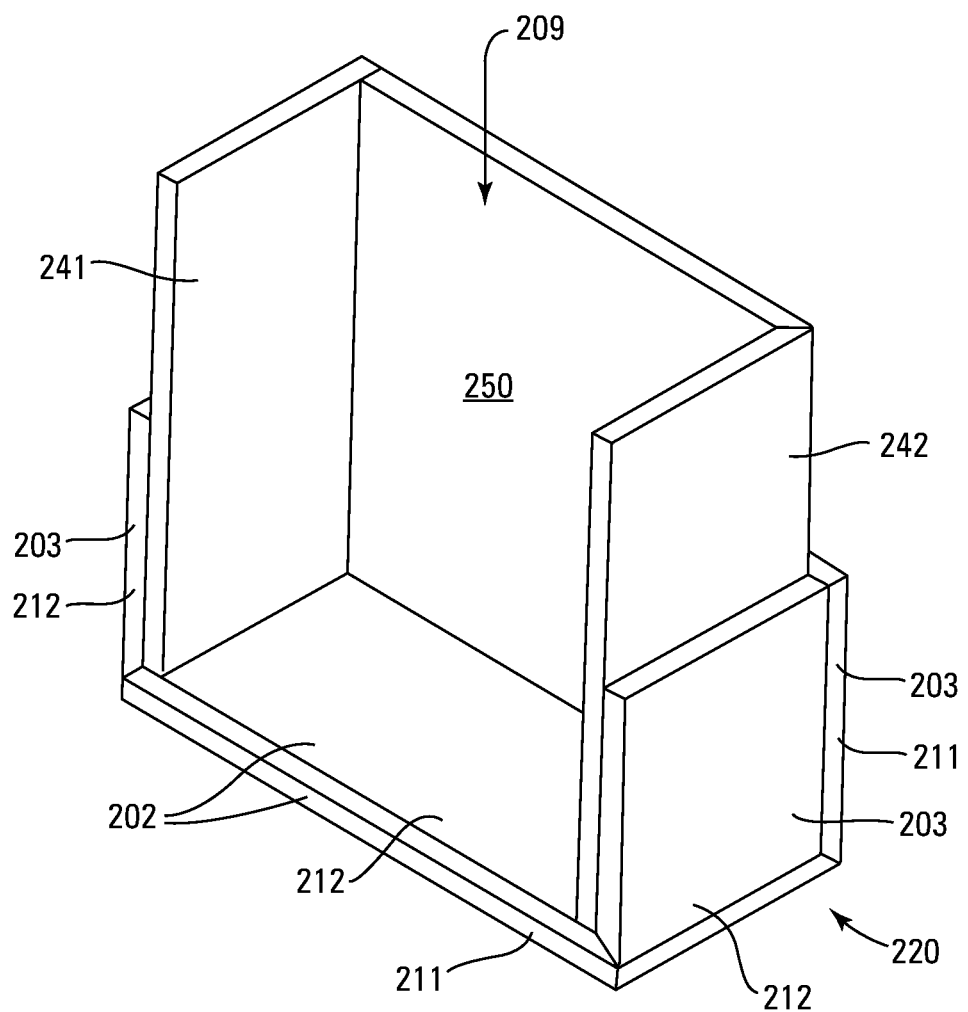
FIG. 5 is a cross-sectional view of the assembled lower box portion and inner sleeve component of the thermal insulation layer depicted in FIG. 3, taken along line 5-5.
Figure 6:
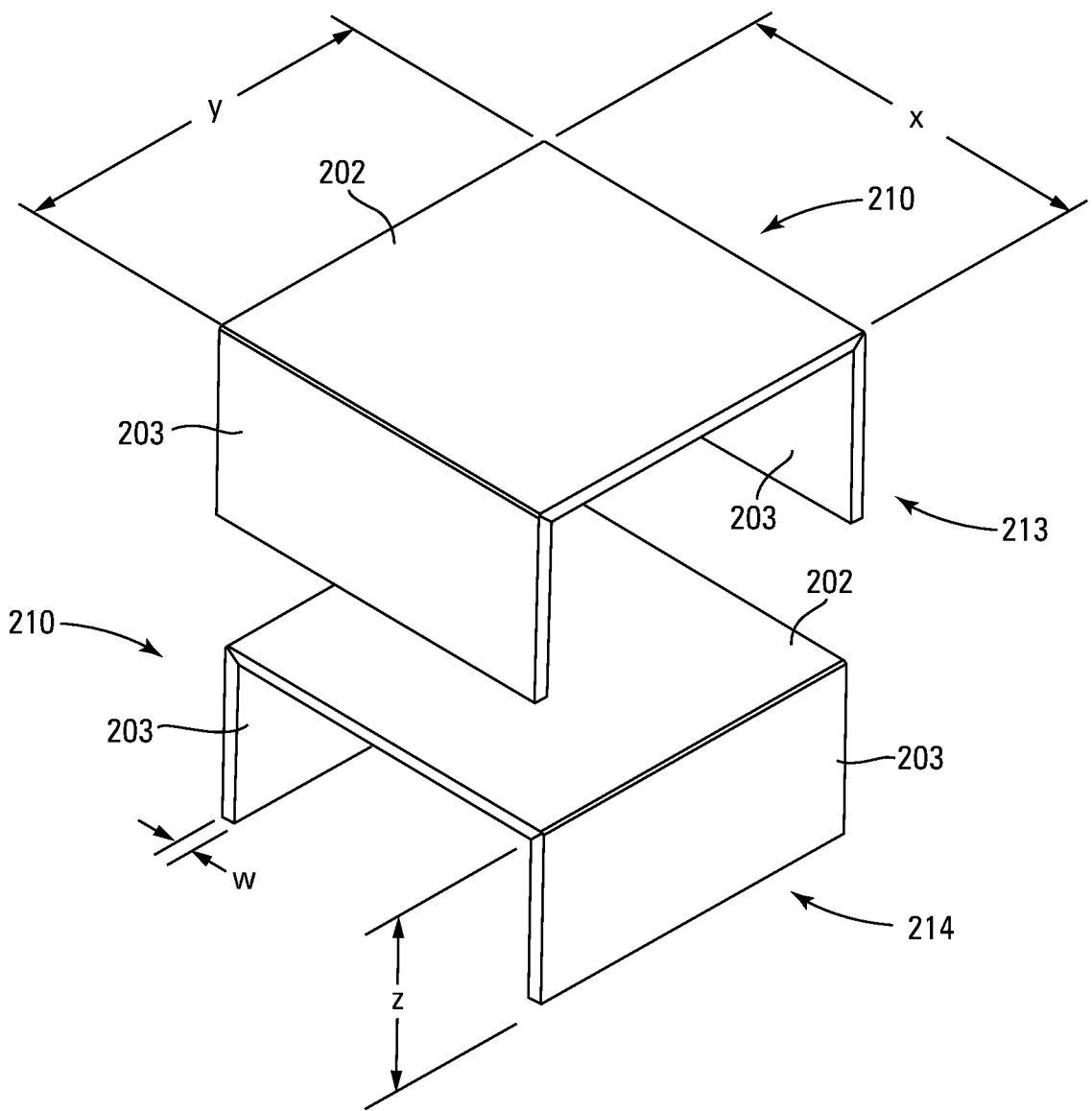
FIG. 6 is an exploded perspective view of the upper box portion of the thermal insulation layer depicted in FIG. 3.
Figure 7:
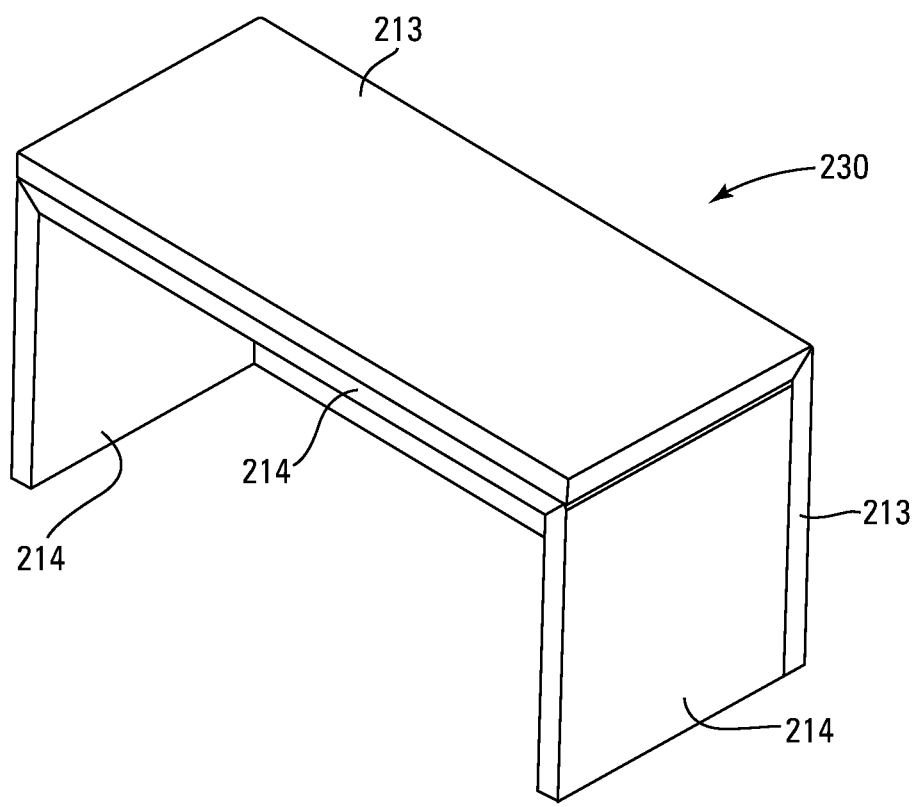
FIG. 7 is a cross-sectional view of the assembled upper box portion of the thermal insulation layer depicted in FIG. 3, taken along line 6-6.
Figure 11:
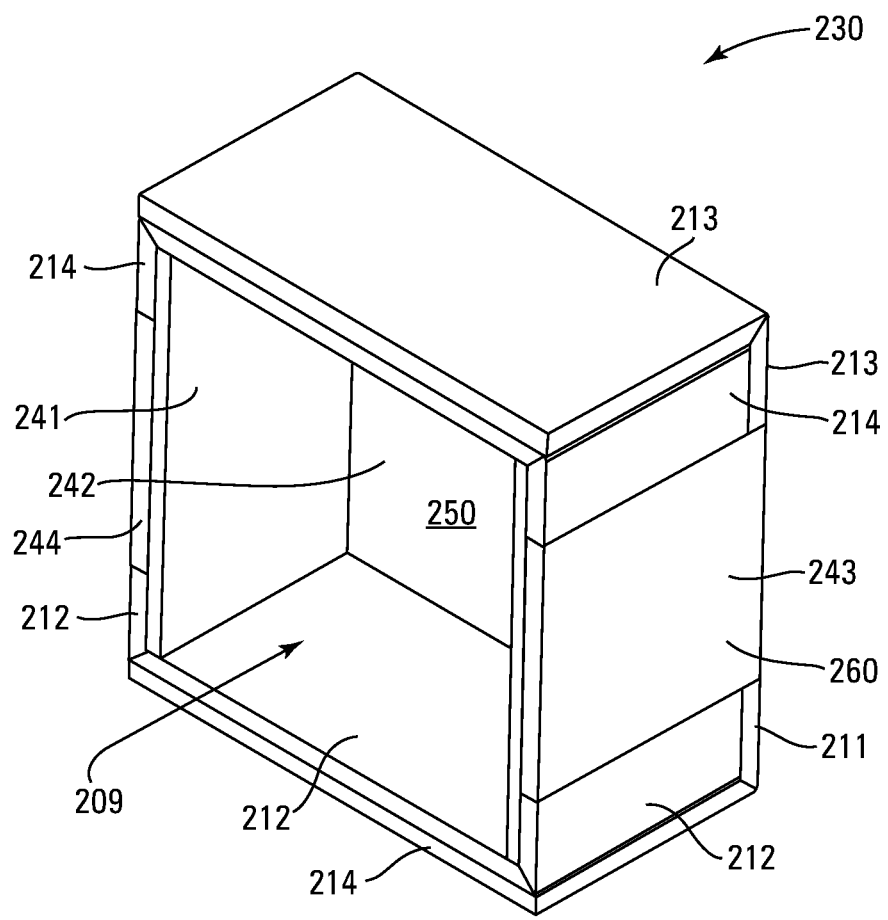
FIG. 11 is a cross-sectional view of the thermal insulation layer depicted in FIG. 9, fully assembled and taken along line 11-11.

Referring to FIGS. 5 and 11, the inner sleeve of thermal insulation 250 is preferably sized relative to the other components of the container 10 that the lower and upper edges (unnumbered) of the inner sleeve 250 abut the inner facing major surface 201a of the central panel section 202 of the second and fourth C-shaped units 212 and 214 of the lower and upper box-portions 220 and 230, respectively when the container 10 is fully assembled.

Figure 9:
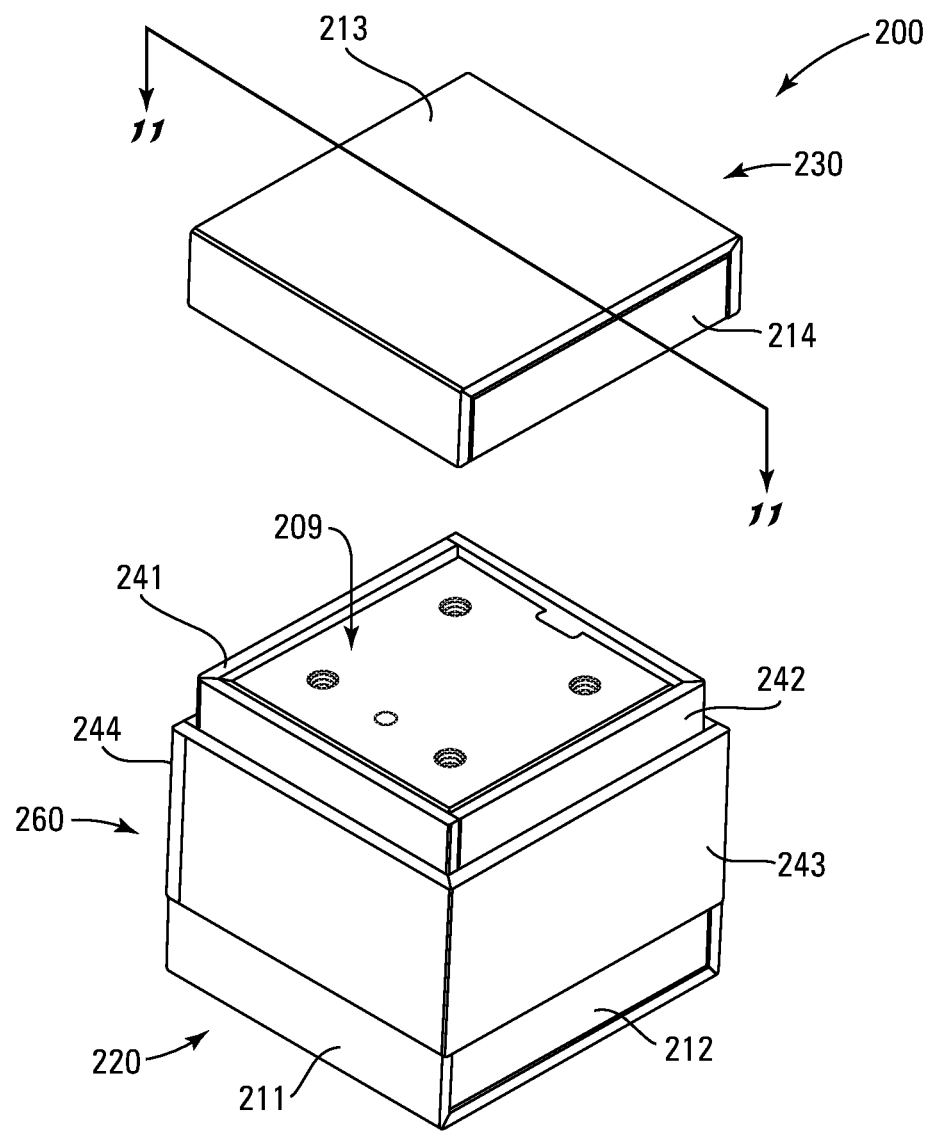
FIG. 9 is a front perspective view of the thermal insulation layer of the invention depicted in FIG. 8, with the upper box portion of the thermal insulation layer lifted to provide access to the thermally insulated payload chamber.
Figure 10:
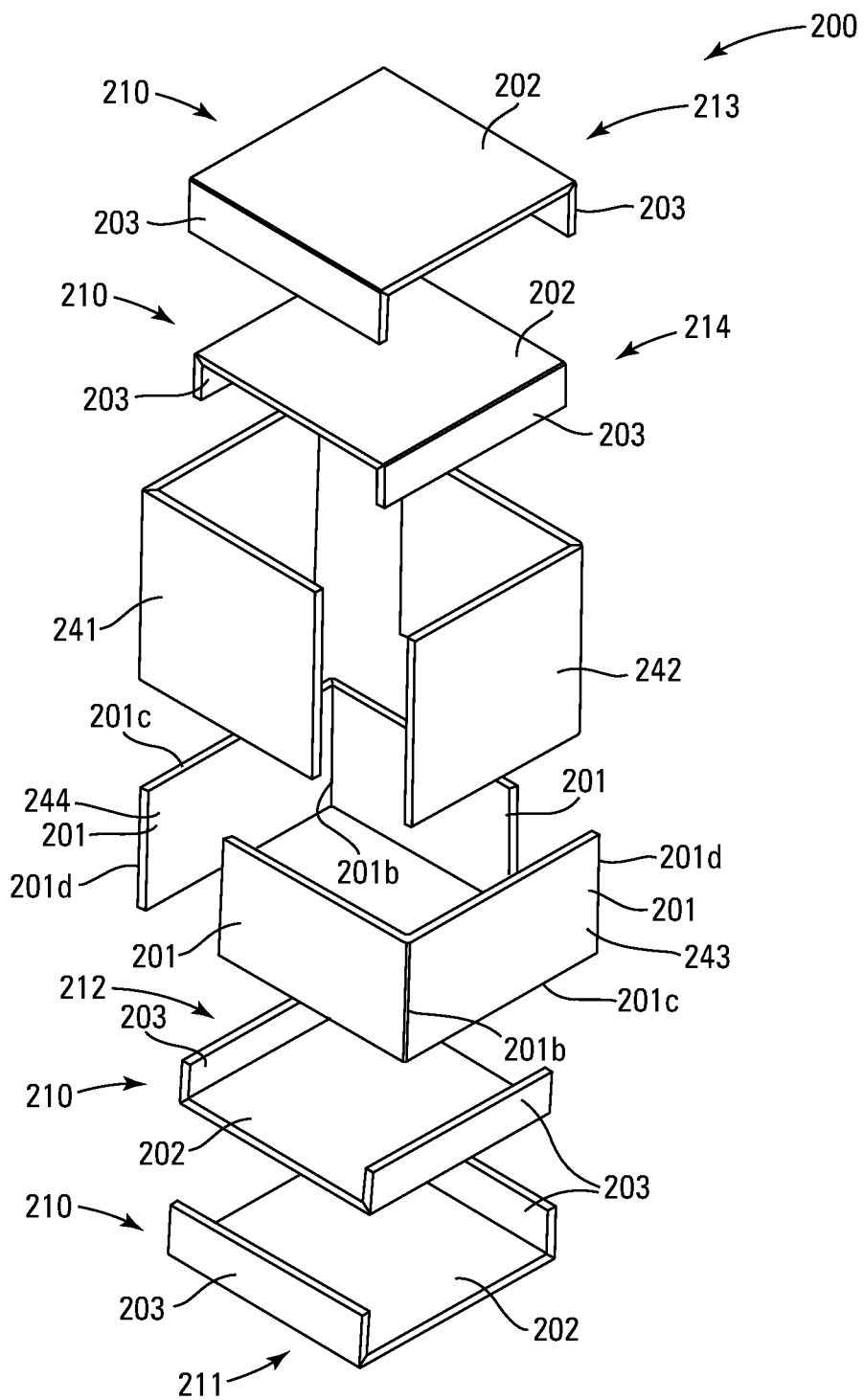
FIG. 10 is an exploded perspective view of the thermal insulation layer depicted in FIG. 9.

Referring to FIGS. 9-11, in order to accommodate taller containers 10, an outer sleeve of thermal insulation 260 may be provided over a central portion of the sidewalls of the thermally insulated payload chamber 209 between the lower and upper box portions 220 and 230. The outer sleeve of thermal insulation 260 is comprised of a pair of two panel wall units 240, each having two vacuum insulated panel sections 201 under individual or common vacuum configured and arranged to articulate relative to one another to allow formation of three-dimensional units.

These third 243 and fourth 244 wall units are each formed from a flat stock rectangular cuboidal vacuum insulated panel having two articulating panel sections 201, each having two transversely spaced major surfaces 201a, a beveled facing edge 201b facing the other panel section 201, a single orthogonal end edge 201d longitudinally spaced from the beveled facing edge 201b, and a pair of laterally spaced orthogonal side edges 201c.

Referring to FIG. 11, the outer sleeve of thermal insulation 260 is preferably sized relative to the other components of the container 10 that the lower edges (unnumbered) of the outer sleeve 260 abut the exposed end edges 201d of the distal panel sections 203 of the lower box portion 220, and the upper edges (unnumbered) of the outer sleeve 260 abut the exposed end edges 201d of the distal panel sections 203 of the upper box portion 230 when the container 10 is fully assembled.

I claim:
1. A thermally insulated shipping container, comprising:
(a) an outer shell having a bottom, sidewalls and an openable top, and defining a volume,
(b) a lower box-portion of thermal insulation lining the bottom and lower portions of the sidewalls of the outer shell, the lower box portion of thermal insulation comprising nested first and second C-shaped units wherein each C-shaped unit is formed from a flat stock rectangular cuboidal vacuum insulated panel having a linear row of one central and two distal rigid articulating panel sections, and (c) an upper box-portion of thermal insulation covering the openable top and lining upper portions of the sidewalls of the outer shell, the upper box portion of thermal insulation comprising nested third and fourth C-shaped units wherein each C-shaped unit is formed from a flat stock rectangular cuboidal vacuum insulated panel having a linear row of one central and two distal rigid articulating panel sections.

2. The thermally insulated shipping container of claim 1 wherein the lower box-portion of thermal insulation and the upper box-portion of thermal insulation form an insulated payload chamber within the volume, and the thermally insulated shipping container further comprises an inner sleeve of thermal insulation lining the sidewalls of the thermally insulated payload chamber whereby the thermally insulated payload chamber is completely enclosed by a dual layer of vacuum insulation, the inner sleeve of thermal insulation including a pair of dual panel wall units each formed from a flat stock rectangular cuboidal vacuum insulated panel having two articulating panel sections each with a 45° beveled facing edge.

3. The thermally insulated shipping container of claim 1 wherein:
   (a) the central panel section on each vacuum insulated panel has two transversely spaced major surfaces, a pair of longitudinally spaced 45° beveled facing edges and a pair of laterally spaced orthogonal side edges,
   (b) the distal panel sections on each vacuum insulated panel each have two transversely spaced major surfaces, a beveled facing edge, an orthogonal end edge longitudinally spaced from the beveled facing edge, and a pair of laterally spaced orthogonal side edges,
   (c) the second C-shaped unit is sized, configured and arranged relative to the first C-shaped unit that the side edges on the two distal panel sections on the second C-shaped unit abut a major surface of a distal panel section on the first C-shaped panel when the C-shaped units are nested with a 90° rotation of the second C-shaped unit relative to the first C-shaped unit so as to rotationally offset the distal panel sections on the first and second C-shaped units, and
   (d) the fourth C-shaped unit is sized, configured and arranged relative to the third C-shaped unit that the side edges on the two distal panel sections on the fourth C-shaped unit abut a major surface of a distal panel section on the third C-shaped unit when the C-shaped units are nested with a 90° rotation of the fourth C-shaped unit relative to the third C-shaped unit so as to rotationally offset the distal panel sections on the third and fourth C-shaped units.

4. The thermally insulated shipping container of claim 3 wherein each C-shaped unit has (i) identically sized distal panel sections, (ii) an exterior length measured laterally from one orthogonal side edge of the central panel section to the other orthogonal side edge of the central panel section, (iii) an exterior width measured longitudinally from one facing edge of the central panel section to the other facing edge of the central panel section, and (iv) an exterior height measured from the orthogonal end edge of either distal panel section to the facing edge of the same distal panel section, wherein the panel sections on all of the C-shaped units have a uniform thickness of w, and each C-shaped unit has the following exterior dimensions:

(a) first C-shaped unit:
   (1) length=$x_1$
   (2) width=$y_1$
   (3) height=$z_1$
(b) second C-shaped unit:
   (1) length=$y_1-2w$
   (2) width=$x_1$
   (3) height=$z_1-w$
(c) third C-shaped unit:
   (1) length=$x_3$
   (2) width=$y_3$
   (3) height=$z_3$
(d) fourth C-shaped unit:
   (1) length=$y_3-2w$
   (2) width=$x_3$
   (3) height=$z_3-w$.

5. The thermally insulated shipping container of claim 4 wherein the first and third C-shaped units have identical dimensions and the second and fourth C-shaped units have identical dimensions.

6. The thermally insulated shipping container of claim 1 wherein the first and third C-shaped units have identical dimensions and the second and fourth C-shaped units have identical dimensions.

7. The thermally insulated shipping container of claim 1 wherein the panel sections of each C-shaped units are under common vacuum.

8. The thermally insulated shipping container of claim 1 wherein each panel section of each C-shaped unit is individually hermetically sealed and under an individual vacuum.

9. A thermally insulated shipping container, comprising:
   (a) an outer shell defining a volume,
   (b) a lower box-portion of thermal insulation and an upper box portion of thermal insulation lining the volume, together forming a fully enclosed thermally insulated payload chamber,
   (c) each box-portion having nested primary and secondary C-shaped units wherein each C-shaped unit is formed from a flat stock rectangular cuboidal vacuum insulated panel having a linear row of one central and two distal rigid articulating panel sections,
   (d) wherein (i) the central panel section on each vacuum insulated panel has two transversely spaced major surfaces, a pair of longitudinally spaced 45° beveled facing edges and a pair of laterally spaced orthogonal side edges, (ii) the distal panel sections on each vacuum insulated panel each have two transversely spaced major surfaces, a beveled facing edge, an orthogonal exposed end edge longitudinally spaced from the beveled facing edge, and a pair of laterally spaced orthogonal side edges, and
   (e) wherein the secondary C-shaped unit is sized, configured and arranged relative to the primary C-shaped unit that the side edges of the two distal panel sections on the secondary C-shaped unit abut a major surface of a distal panel section on the primary C-shaped unit when the units are nested with a 90° rotation of the secondary C-shaped unit relative to the primary C-shaped unit so as to rotationally offset the distal panel sections on the primary and secondary C-shaped units.

10. The thermally insulated shipping container of claim 9 further comprising an inner sleeve of thermal insulation lining the sidewalls of the thermally insulated payload chamber with lower and upper edges of the inner sleeve each abutting a major surface of a central panel section of one of the secondary C-shaped units, wherein the inner sleeve of thermal insulation includes a pair of wall units each formed from a flat stock rectangular cuboidal vacuum insulated panel having two articulating panel sections each with a 45° beveled facing edge, and whereby the thermally insulated payload chamber is completely enclosed by a dual layer of vacuum insulation.

11. The thermally insulated shipping container of claim 10 further comprising an outer sleeve of thermal insulation lining the volume between the lower and upper box portions with lower edges of the outer sleeve abutting the exposed end edges of the distal panel sections of the lower box portion, and upper edges of the outer sleeve abutting the exposed end edges of the distal panel sections of the upper box portion, wherein the outer sleeve of thermal insulation includes a pair of dual panel wall units each formed from a flat stock rectangular cuboidal vacuum insulated panel having two articulating panel sections each with a 45° beveled edge facing the other panel section.

12. A kit from which a thermally insulated shipping container may be assembled, the kit comprising:
    (a) an outer shell having a bottom, sidewalls and an openable top, and defining a volume,
    (b) four flat stock rectangular cuboidal vacuum insulated panels, each having a linear row of one central and two distal rigid articulating panel sections capable of being folded into a 3-dimenisonal C-shaped unit, wherein
    (c) the four flat stock rectangular cuboidal vacuum insulated panels are configured and arranged such that when folded into 3-dimenisonal C-shaped units a first unit can nest within a second unit to form a lower box-portion of thermal insulation sized for lining the bottom and a lower portion of the sidewalls of the volume, and a third unit can nest within a fourth unit to form an upper box-portion of thermal insulation sized for covering the open top and lining an upper portion of the sidewalls of the volume.

13. The kit of claim 12 further comprising a pair of dual panel wall units each formed from a flat stock rectangular cuboidal vacuum insulated panel having two articulating panel sections each with a 45° beveled facing edge, wherein the flat stock rectangular cuboidal vacuum insulated panels are configured and arranged such that when folded into wall units they can cooperatively form a sleeve of thermal insulation configured for lining a thermally insulated payload chamber formed by lining the volume with all four of the C-shaped units.

14. The kit of claim 12 wherein:
    (a) the central panel section on each vacuum insulated panel has two transversely spaced major surfaces, a pair of longitudinally spaced 45° beveled facing edges and a pair of laterally spaced orthogonal side edges,
    (b) the distal panel sections on each vacuum insulated panel are identically sized with each distal panel section having two transversely spaced major surfaces, a beveled facing edge, an orthogonal exposed end edge longitudinally spaced from the beveled facing edge, and a pair of laterally spaced orthogonal side edges, and
    (c) the flat stock rectangular cuboidal vacuum insulated panels are configured and arranged such that the panel sections on all of the C-shaped units have a uniform thickness of w, and when each panel is folded in a C-shaped unit, the C-shaped units have (i) an exterior length measured laterally from one orthogonal side edge of the central panel section to the other orthogonal side edge of the central panel section, (ii) an exterior width measured longitudinally from one facing edge of the central panel section to the other facing edge of the central panel section, and (iii) an exterior height measured from the orthogonal exposed end edge of either distal panel section to the corresponding facing edge of the distal panel section, with the C-shaped units having the following exterior dimensions:
    (1) first C-shaped unit:
        (A) length=$x_1$
        (B) width=$y_1$
        (C) height=$z_1$
    (2) second C-shaped unit:
        (A) length=$y_1-2w$
        (B) width=$x_1$
        (C) height=$z_1-w$
    (3) third C-shaped unit:
        (A) length=$x_3$
        (B) width=$y_3$
        (C) height=$z_3$
    (4) fourth C-shaped unit:
        (A) length=$y_3-2w$
        (B) width=$x_3$
        (C) height=$z_3-w$.

15. The kit of claim 14 wherein the first and third C-shaped units have identical dimensions and the second and fourth C-shaped units have identical dimensions.

16. The kit of claim 12 wherein the panel sections of each flat stock rectangular cuboidal vacuum insulated panel are under common vacuum.

17. The kit of claim 12 wherein each panel section of each flat stock rectangular cuboidal vacuum insulated panel is individually hermetically sealed and under an individual vacuum.

* * * * *